United States Patent [19]
Markow

[11] 4,318,434
[45] Mar. 9, 1982

[54] BANDED TIRE LOAD ENHANCEMENT SYSTEM

[75] Inventor: Edward G. Markow, Oakdale, N.Y.

[73] Assignee: Grumman Aerospace Corporation, Bethpage, N.Y.

[21] Appl. No.: 145,857

[22] Filed: May 1, 1980

[51] Int. Cl.³ .................. B60C 17/00; B60C 5/00; B60C 9/00

[52] U.S. Cl. .................... 152/156; 152/197; 152/200; 152/330 RF; 152/340; 152/361 R

[58] Field of Search ............. 152/340, 330 RF, 156, 152/199, 200, 341, 352 A, 361 R, 331, 339, 155, 192, 193, 197

[56] References Cited

U.S. PATENT DOCUMENTS

| | | | |
|---|---|---|---|
| 2,334,893 | 11/1943 | Arey | 152/342 |
| 2,554,815 | 5/1951 | Church | 152/339 X |
| 2,680,463 | 6/1954 | Khalil | 152/339 |
| 3,038,517 | 6/1962 | McConkie | 152/349 |
| 3,134,418 | 5/1964 | McConkie | 152/340 X |
| 3,724,521 | 4/1973 | Coddington et al. | 152/340 |
| 3,945,419 | 3/1976 | Kosanke | 152/330 RF X |
| 4,008,743 | 2/1977 | Welch | 152/158 |
| 4,067,374 | 1/1978 | Alden et al. | 152/330 RF X |
| 4,111,249 | 9/1978 | Markow | 152/330 RF |
| 4,241,775 | 12/1980 | Jackson | 152/330 RF |

Primary Examiner—John E. Kittle
Assistant Examiner—Thomas Bokan
Attorney, Agent, or Firm—Mellor A. Gill

[57] ABSTRACT

Passive, self-energizing means for increasing the load carrying capabilities in the depressurized condition of a banded radial run-flat tire system. In this invention, an inner tube inflated to a pressure of about 3-5 psi is positioned on the wheel rim inside the tire which is inflated to its normal pressure of about 30 psi. Because of this pressure differential, the inner tube is compressed to about one-sixth its volume at ambient pressure and in normal operation it rides out of contact with the inside walls of the tire casing without interaction therewith. If the tire is depressurized because of a puncture or other cause, the release of tire pressure on the inner tube results in the expansion of the tube outwards to maintain the curvature in the sidewalls, which curvature enhances the load capacity of the tire in the depressurized condition.

3 Claims, 4 Drawing Figures

FIG.3 TYPICAL BANDED TIRE VERTICAL DEFLECTION VS INFLATION PRESSURE
(GR 78-16 TIRE WITH 1000 POUND VERTICAL LOAD)

BANDED TIRE LOAD ENHANCEMENT SYSTEM

BACKGROUND OF THE INVENTION

1. Field of the Invention

This invention relates to banded radial run-flat tires and, more particularly, to self-energized means for enhancing the load-carrying capabilities of such tires in the deflated or partially deflated condition.

2. Background of the Invention

An area of tire technology which has engaged investigators over the years is the run-flat pneumatic tire concept. A run-flat tire is one designed to support a vehicle for operation even if the tire has partially or totally lost its inflation pressure. The advantages of such a tire in safety, convenience, cost, and weight and space saving are obvious. A recent successful development in the art of run-flat tires is the band-reinforced radial tire invented by the inventor in the present application, which banded tire is the subject of U.S. Pat. No. 4,111,249, assigned to the assignee of the present invention. The run-flat tire with which the load enhancement system of the subject invention is used is the tire disclosed in that Markow patent, U.S. Pat. No. 4,111,249, which is hereby incorporated herein by reference.

The banded run-flat tire is a pneumatic radial tire having a casing with a crown and sidewalls extending from the crown on either side to annular beads which, in a conventional way, are used to mount the tire in a sealed relationship on the rim of a wheel. In the design, the band element, which preferably is a thin structural ring of high-strength steel or a fiber/epoxy composite, is incorporated circumferentially into the crown of the tire under the tread thereof. Radial tires, as is well known, have a multiplicity of closely spaced radial reinforcing cords or wires in the sidewalls of the tire casing. In the tire disclosed in the above-referenced patent to Markow, the radial cords or wires function as spoke-like reinforcing elements to stabilize the circumferential band. When the tire is deflated, the radial spoke-like elements and the band stabilized thereby form a load-sustaining structure analogous to an elastic arch. In the design, the band receives vertical, drag, and side loads from the road or ground surface, and carries those loads in compression and bending; the radial spoke-like elements act as tension members to support the axle. A prime function, also, of the closely spaced radial elements is to stabilize the thin band against buckling.

A critical factor in the bended radial tire concept is the structural interaction of the band with the radial elements in the tire sidewalls. In the pressurized condition of operation with the sidewalls (and the radial elements therein) bulging outwardly in the normal curved configuration, the band contributes between 5–10% to the tire's spring rate. Unpressurized, the sidewalls tend to straighten out in all but the ground contact area and the radial elements become vertical tensile elements creating an arch structure in which 80–95% of the load is carried in the band. Overload imposes stresses on the band that makes it vulnerable to fatigue.

I have found that a small outward force on the sidewalls to cause them to bulge and thereby reduce the length of sidewall extension results in a reduction in band deflection that provides a significant increase in load-carrying ability up to 50% for a banded tire in the deflated condition.

In my invention, the small outward force on the sidewalls to cause them to bulge is provided by an undersized inner tube stretched to lie within the drop center of the rim. This inner tube is inflated to a pressure that is significantly lower than the normal inflation pressure in the tire and, although the pressure in the tube is not adequate to support the vehicle when normal tire inflation pressure is lost, the tube pressure is sufficient to provide the necessary outward force on the sidewalls that impart the required curvature to the spoke-like radial elements therein. Typically, in this invention, if the tire is inflated to a pressure of about 30 psi, the tube will be inflated to a pressure of about 3–5 psi. Because of this pressure differential, in operation with the tire at normal pressure, the tube is compressed to less than a quarter of its expanded volume such that it rides in the drop center of the wheel rim out of contact with the tire crown and substantially all of both sidewalls. Thus, there is virtually no interaction of the inner tube with the tire in operation until normal tire inflation pressure is lost. Because of the band, the banded tire is substantially invulnerable to punctures through the tread. Thus, a puncture of the inner tube due to a retained object will not be experienced. Puncture of the inner tube by a retained object is a recognized weakness in prior inner tube systems.

DESCRIPTION OF THE PRIOR ART

In the art of pneumatic tires, the use of inner tubes goes back, of course, to the first practical pneumatic tires. In conventional tubed tires, the inner tube is inflated to a pressure that will support the vehicle upon which the tire is mounted; a loss of tube pressure puts the tire out of operation. Over the years, tubeless tires have largely supplanted the tire and tube system, particularly for passenger car use. However, the prior art shows a number of examples of what are termed safety tires which are either a tubed or tubeless tire containing an inner tube that is designed to expand to support the vehicle or to retain the bead seal when the tire or the normal tube is punctured. Examples of these constructions are disclosed in G. C. Arey; F. O. Church; S. Khalil; D. M. Coddington et al.; and J. Kosanke, in U.S. Pat. Nos. 2,334,893; 2,554,815; 2,680,463; 3,724,521; and 3,945,419 respectively. It will be noted that none of these prior art examples of safety tire systems teach their use to apply a force on the sidewalls of a deflated tire of the banded radial type and, further, the inner tubes in these constructions are inflated to the same or substantially the same pressure used normally in the tire itself. There are disclosures in the prior art by H. S. McConkie and J. A. Welch, in U.S. Pat. Nos. 3,038,517 and 4,008,743 respectively of the inner tube of a safety tire being inflated to a pressure less than that of the tire itself, but H. S. McConkie teaches a pressure in the tube that is approximately about a half of the pressure used in the tire, and Welch teaches the use of a pressure about a third of that in the tire. In any case, the tube pressure used by McConkie and Welch is sufficient to support the vehicle which is not the case with the 3–5 psi pressure used in the inner tube of the subject invention. If McConkie or Welch used a pressure of 3–5 psi in their constructions, the tire would be destroyed if the vehicle upon which it is mounted is driven over a mile with the tire deflated.

SUMMARY OF THE INVENTION

This invention is a means for increasing the load capacity of a banded radial run-flat tire operating in a depressurized condition. As has been set forth previously herein, a banded radial tire has a thin, high-strength band in the crown thereof, which band is reinforced and stabilized by the multiplicity of spoke-like radial ply elements in the sidewalls of the tire casing. The radially stabilized band thus is able to carry its design load even when the tire is completely depressurized. When operating in the depressurized condition, the load on the tire puts the sidewalls and the radial elements therein, with the exception of those in a sector of the tire at and near the road surface of about 45° on either side of the surface when viewed from the side of the tire, into tension and tends to straighten them out. This straightening of the radial stabilizing elements increases the deflections of the band and, particularly when the tire is overloaded, promotes stress faatique therein that adversely effects the life of the band and tire. In this invention, an inner tube which is inflated to a pressure which is only a fraction of the inflation pressure of the tire is provided in the tire. When the tire is punctured or otherwise deflated, the inner tube is self-energized and expands outwardly to put a force on the sidewalls that curves the radial elements therein to thereby enhance the load-carrying capabilities of the deflated banded tire. Because the tube is inflated to a pressure of only about 3-5 psi and the normal inflation pressure of the tire is about 30 psi, the tube in normal operation is compressed or collapsed by the pressure differential. Thus, in operation, the tube normally rides in the drop-center rim of the wheel on which the tire is mounted. Therefore, although the tube will expand outwardly automatically to place the requisite force on the sidewalls when the tire is depressurized, the compressed tube is substantially clear of the inside walls of the tire casing and does not interact with the tire in normal operation. When the tube itself is depressurized, it does not interfere with normal tire demounting equipment, permitting repairs to be made readily without a requirement for special tools or procedures.

It is thus a principal object of this invention to provide passive self-energized means in a banded radial run-flat tire which comes into operation automatically to enhance the load-carrying capabilities of the tire in the depressurized condition, but which does not interact with the tire in normal operation.

It is another object of this invention to provide a self-energizing inner tube for enhancing the load carrying capacity of a depressurized run-flat banded radial pneumatic tire, the use of which inner tube does not require the tire itself to be modified in any way.

It is a further object of this invention to provide means for enhancing the load-carrying capacity of a depressurized banded radial tire, which means does not require any alteration in the servicing or maintenance procedures, nor in the tools and equipment used to mount, dismount, and service the tire.

Yet another object of this invention is to provide means for enhancing the load capacity of a banded radial tire in depressurized operation, but which does not interact with the tire in normal operation such that there is no energy dissipation in rubbing between those means and the tire that would waste fuel in normal driving conditions.

A yet further object of this invention is to provide means in a banded radial tire which will enhance the load-carrying capabilities in the unpressurized condition, such that in the basic tire design a much thinner, lighter reinforcing band for a given load is permitted.

Another object of this invention is to spread the useful load range of a banded radial tire without degrading the ride qualities of the tire.

Still another object of this invention is to provide means in a banded radial tire for enhancing its load capabilities and bead retention in the unpressurized condition, which means are designed for ease and economy of manufacture and which are readily installed without special equipment in the tire.

DESCRIPTION OF THE DRAWINGS

For the purpose of illustrating the invention, there is shown in the drawings the form which is presently preferred; however, it should be understood that the invention is not necessarily limited to the precise arrangement here shown.

DESCRIPTION OF THE PREFERRED EMBODIMENT

Figure 1:
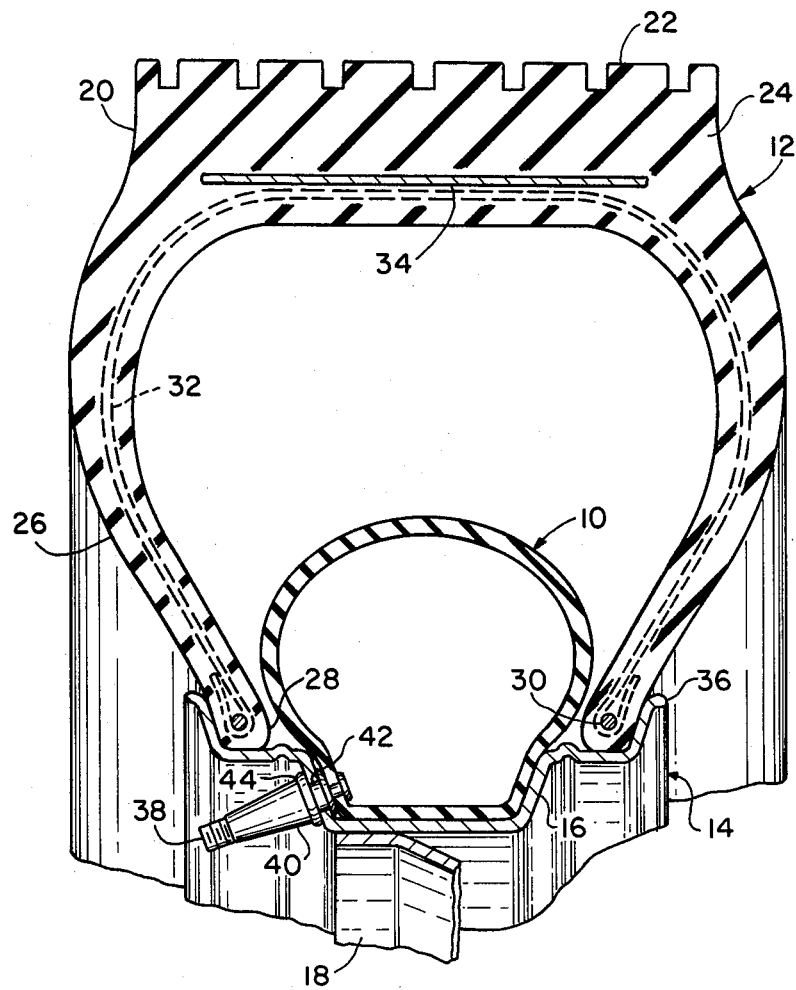
FIG. 1 is a cross-sectional view of an embodiment of the load enhancement system of my invention in a banded radial tire showing the tire in the pressurized condition.
Figure 2:
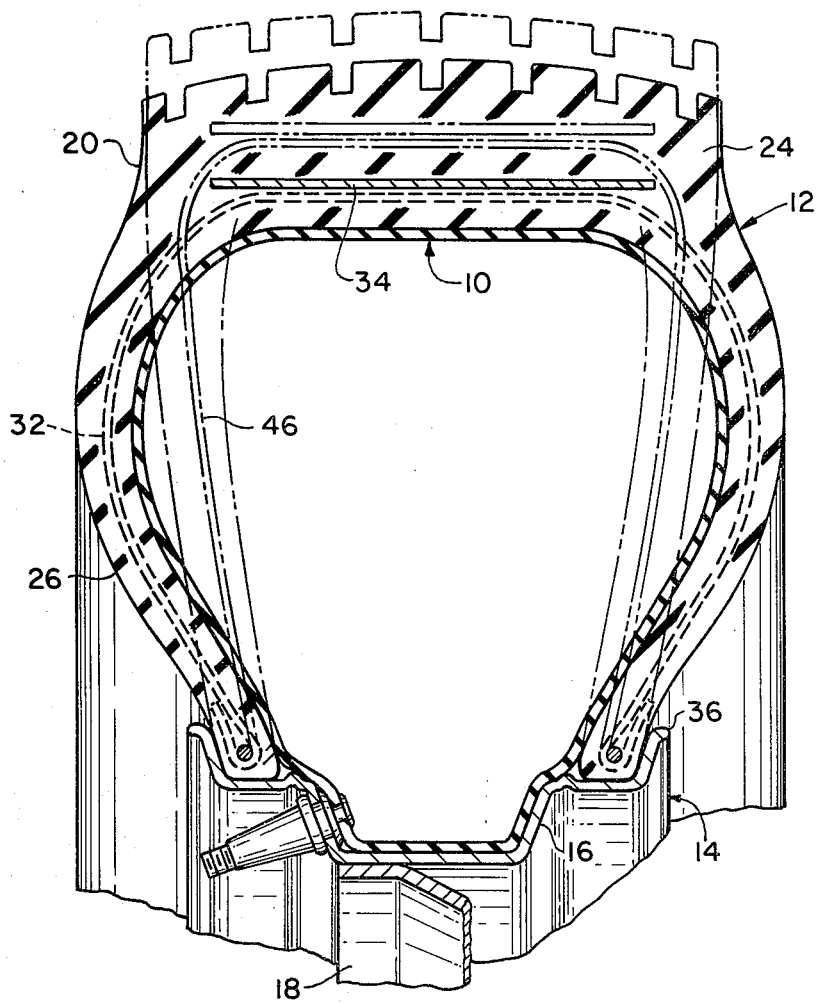
FIG. 2 is a cross-sectional view of an embodiment of the load enhancement system of my invention in a banded radial tire showing the tire in a depressurized condition.

Having now more particular reference to the drawings, FIGS. 1 and 2 show a preferred embodiment of the system of my invention. This system comprises an inner tube 10 in a banded radial pneumatic tire 12. Tire 12 is illustrated mounted on a wheel 14 (only a fragmentary section of which is shown) which may be of a conventional type having a drop-center rim 16 welded to a wheel body 18. Tire 12 comprises a carcass or casing 20 having an outer peripheral tread portion 22 in the crown 24 of the casing and sidewalls 26 extending on either side therefrom to beads 28 in the radial inward peripheral portions of the sidewalls. Tread 22 may be incised with the usual tread patterns or may be provided with cleats to improve tire traction or to serve other considerations. Beads 28, which may be reinforced in a known manner with suitable annular cords or wires 30, are adapted to seat in an airtight relationship in the rim 16 of the wheel when the tire is mounted thereupon. The sidewalls of the casing are reinforced by the usual known weftless radial elements 32 which may be of two-ply textile construction. As discussed in the aforereferenced Markow patent, U.S. Pat. No. 4,111,249, the radial plies in the tire sidewall act as spoke-like elements that reinforce and stabilize the annular band which will now be described.

Located in the crown of the tire underlying the tread thereof is an annular compression element or band 34 which is suitably integrated or bonded into the casing of the tire. Band 34 may be fabricated out of a solid strip of suitable high-strength metal or alloy or of a high-strength composite which can be reinforced by a material such as fiberglass, graphite, or Kevlar. Further reinforcement of the tire in the crown thereof can be provided by means of the usual annular belts fabricated out of plies of suitable textile fibers or steel wires; however, to avoid the possibility of confusion herein, those conventional annular belts are not shown in the drawings nor will they be further described.

Inner tube 10 is of a standard torodial construction and may be made of any number of suitable materials such as the normally used butyl rubber. It is feasible in this invention to use an inner tube of a size smaller than that normally used in a tire-tube system for the size of tire 12 employed; the governing size consideration is that it be possible to slip the inner tube over the raised flanges 36 of the wheel rim to install the tube thereon. An inflation valve 38 is provided for the inflation of the inner tube. When the inner tube is mounted on the wheel rim, the stem 40 of the inflation valve 38 protrudes out an opening 42 provided for the purpose in the wheel rim 16. The usual grommet-like sealing means 44 on the inflation valve stem 40 furnishes an air-tight seal for the stem in opening 42. A conventional rim inflation valve (not shown) is fitted for inflating the tire 12.

In operation, the inner tube is mounted on the wheel rim and the stem 40 of the inflation valve is centered in rim opening 42 and the sealing means 44 are seated securely to insure an air-tight installation. Then the tire 12 is mounted on the wheel and the beads are seated in the usual fashion. Inner tube 10 is then inflated to a pressure of about 3-5 psi, then the tire is inflated to its usual inflation pressure of 30 psi. Because of the pressure differential, the inner tube is compressed to more-or-less one-sixth its volume at ambient pressure and will be in a pressure equilibrium and in a substantially elliptical shape centered on the rim and not touching the inside of the tire casing (see FIG. 1). Thus, in the operation of the vehicle with the tire normally inflated, there is substantially no energy dissipation because of a scuffing or rubbing of the inner tube against the inside casing of the tire.

Figure 3:
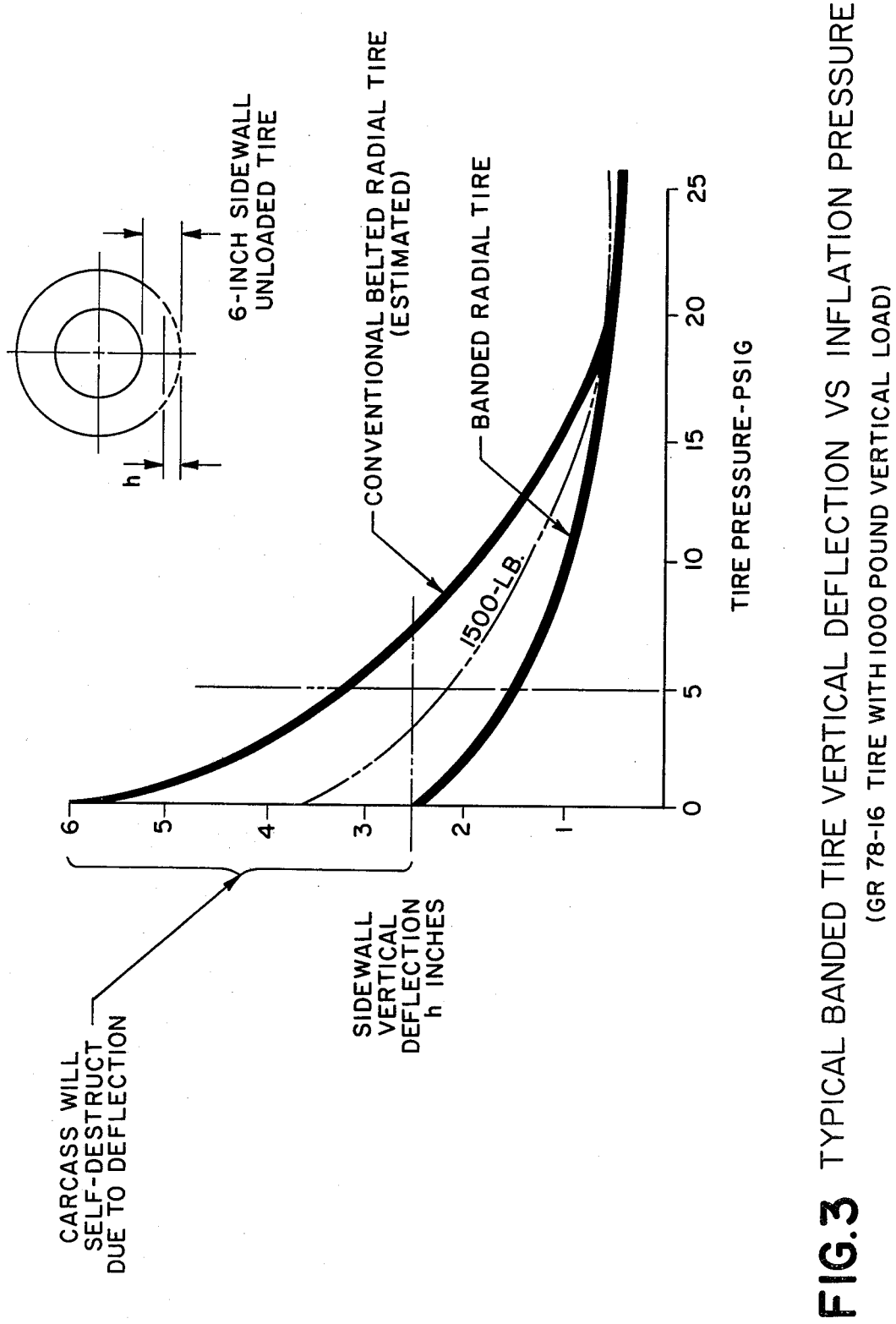
FIG. 3 is a plot of tire vertical deflection as a function of inflation pressure comparing a standard belted radial tire and a banded radial tire.
Figure 4:
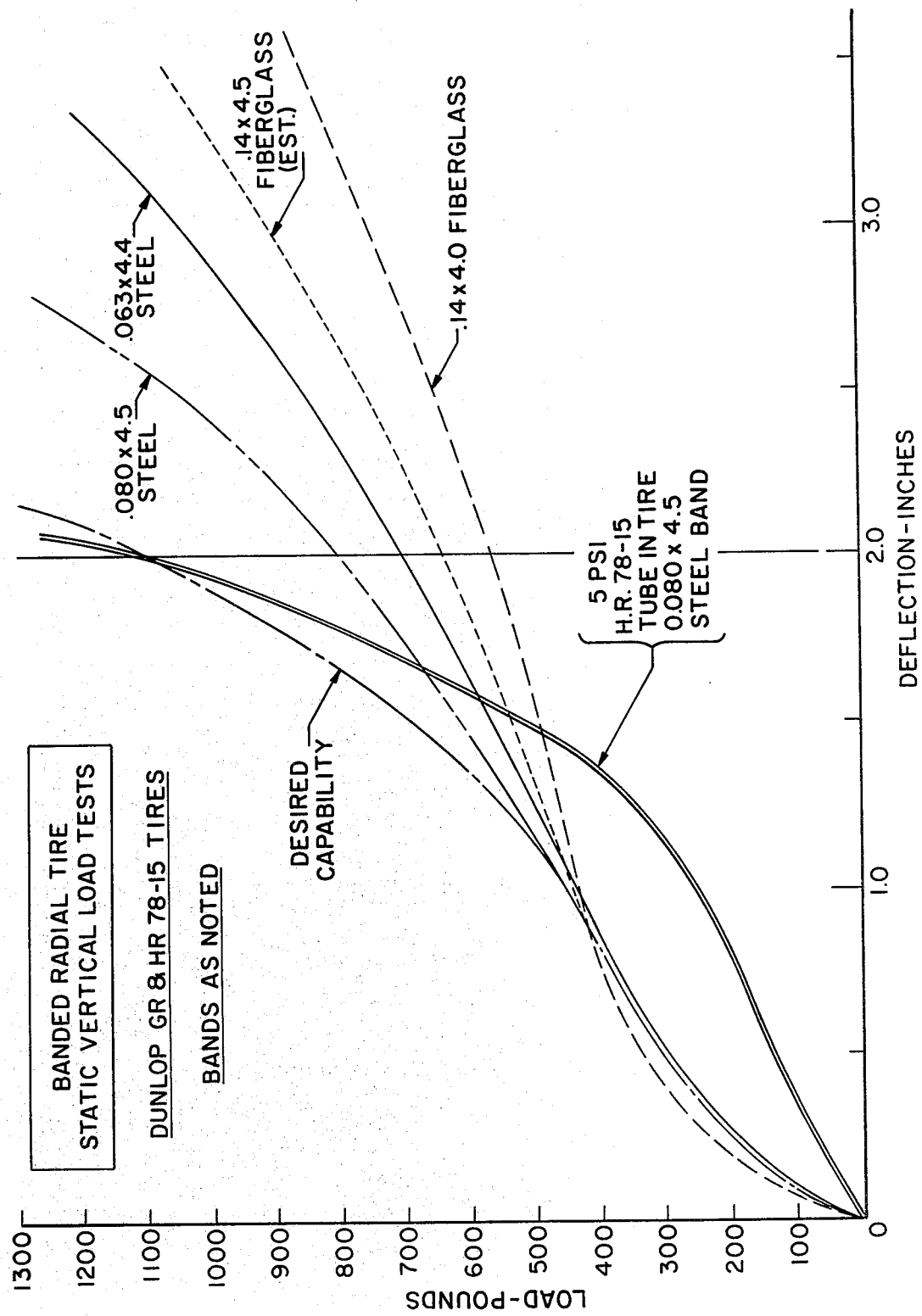
FIG. 4 is a plot of static vertical load tests of various banded radial tires in the depressurized condition illustrating the improvement in load capacity brought about by the system of the invention.

Should the tire be depressurized because of a puncture or other accidental cause, or because advantage is to be taken of the characteristics of the depressurized banded tire for off-the-road operation, the drop in tire pressure causes the inner tube to expand automatically to thereby fill the interior volume of the tire (see FIG. 2). A tube pressure of 3-5 psi in a conventional tire is not sufficient, as indicated in FIG. 3, to support the vehicle, in fact, any inflation pressure below about 8 psi in a conventional tire would result in its destruction in a little more than a mile of driving. However, in a banded radial tire, a pressure of 3-5 psi is enough to press outwardly on the sidewalls of the tire to prevent the straightening of the radial elements 32. A straightening of the radial elements (indicated in dashed lines 46 in FIG. 2) decreases the apparent sidewall (and radial element) spring rate, this decrease in spring rate decreases the load-carrying ability of the tire. A 3-5 psi force on the sidewalls curves the radial elements therein and produces a large increase in sidewall tension acting on the band 34, which increases the load capacity of the banded radial tire by 30-50%. In tests made with a Dunlop HR78-15 radial tire provided with a band with the inner tube inflated to 5 psi and at 2 inches of casing deflection, the load-carrying capability of the tire was increased by about 40%. The increase in load capacity of a banded radial tire with a 0.080 inch thick, 4.5 inch wide steel band as compared with various banded tires without the load enhancement inner tube of the invention is graphically indicated in the plot in FIG. 4. It will be appreciated, also, that a further benefit of the invention is that the inner tube 10 serves the additional valuable function of bead retention when the tire is depressurized.

If the tire has been deliberately depressurized, all that is required to restore the tire to a condition for normal operation is to inflate the tire to its normal operating pressure. When this is done, the tube collapses to its compressed volume out of contact with the inside of the tire casing and ready for self-energization should the tire again be depressurized. If the initial tire depressurization has resulted from a puncture or other accidental cause, the inner tube can be depressurized when repair facilities are reached, permitting the tire to be demounted for repair in the usual fashion.

Although shown and described in what is believed to be the most practical and preferred embodiment, it is apparent that departures from the specific method and design described will suggest themselves to those skilled in the art and may be made without departing from the spirit and scope of the invention. I, therefore, do not wish to restrict myself to the particular construction illustrated and described, but desire to avail myself of all modifications that may fall within the scope of the appended claims.

Having thus described my invention, what I claim is:

1. A self-energized tire load enhancement means for a banded radial run-flat tire system comprising in combination:

a wheel having a hub, a drop-center rim, and a wheel body joining said hub to said rim, said hub accommodating an axle for mounting said wheel on a vehicle;

a resilient, pneumatic banded radial run-flat tire having a casing with a crown, sidewalls extending from said crown on either side to annular bead portions mounting said tire in a sealed relationship on said wheel rim, a resilient annular band element in said tire crown, said band element being stabilized by a multiplicity of closely-spaced substantially spoke-like radial reinforcing elements in said tire sidewalls;

tire inflation means in said wheel rim for the inflation of said tire; and a torodial resilient expandable inner tube located within said casing of said tire, said tube being diametrically undersized with respect to the size of the inner tube normally fitted on said wheel, tube inflation means in said wheel rim for the inflation of said tube, the inflation pressure of said tube being less than a quarter of the inflation pressure of said tire, the tire being inflated to a pressure that in normal operation compresses said tube into the annular region of said tire adjacent said rim substantially clear of the interior walls of said casing whereby, when said tire loses inflation pressure, the release of said tire pressure acting on said tube causes it to expand outwardly against said sidewalls to impart a curvature to the reinforcing elements therein at least about 45° on either side of the centerline of the footprint in contact with the surface to thereby enhance the fatigue characteristics of said band and the load capacity of said deflated tire.

2. The tire system defined in claim 1 wherein the tube is inflated to a pressure that is about 1/6 of the inflation pressure of said tire.

3. The tire system defined in claim 1 wherein the tube is inflated to a pressure of between about 3-5 psi and the tire inflation pressue is about 30 psi.

* * * * *